United States Patent
Bonansea et al.

(10) Patent No.: US 6,502,978 B2
(45) Date of Patent: *Jan. 7, 2003

(54) APPARATUS FOR THE PRODUCTION OF POLYURETHANE MATERIAL WITH A CLEANING MEMBER HAVING A FILLER FEEDING CHANNEL AND AN INCLINED FRONT SURFACE

(75) Inventors: Alberto Bonansea, Seregno (IT); Carlo Fiorentini, Saronno (IT)

(73) Assignee: Afros S.p.A., Caronna Pertusella (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,161

(22) Filed: Apr. 10, 1998

(65) Prior Publication Data

US 2001/0001602 A1 May 24, 2001

(30) Foreign Application Priority Data

Aug. 5, 1997 (IT) ........................................ MI97A01879
Nov. 3, 1997 (IT) ......................................... MI97A2461

(51) Int. Cl.⁷ ........................... B01F 13/00; B01F 15/02
(52) U.S. Cl. ...................... 366/162.5; 366/304; 422/133
(58) Field of Search ............................. 366/101, 137.1, 366/162.4, 162.5, 176.2, 176.4, 341, 304; 239/DIG. 19; 422/133, 135

(56) References Cited

U.S. PATENT DOCUMENTS

| 3,776,702 A | * | 12/1973 | Chant |
| 3,927,833 A | | 12/1975 | Harrison et al. |
| 4,064,295 A | | 12/1977 | Singer |
| 4,332,335 A | | 6/1982 | Fiorentini |
| 4,397,407 A | | 8/1983 | Skoupi et al. |
| 4,503,014 A | * | 3/1985 | Bauer |
| 4,608,233 A | | 8/1986 | Fiorentini |
| 5,080,283 A | | 1/1992 | Kukesh et al. |
| 5,294,052 A | | 3/1994 | Kukesh |
| 5,453,249 A | | 9/1995 | Proksa et al. |
| 5,785,422 A | * | 7/1998 | Eidenmuller |
| 5,858,416 A | * | 1/1999 | Sochtig et al. |
| 6,065,862 A | * | 5/2000 | Althausen et al. |
| 6,079,867 A | * | 6/2000 | Fiorentini et al. |
| 2001/0017816 A1 | * | 8/2001 | Krader et al. |

FOREIGN PATENT DOCUMENTS

DE        1 245 216        9/1971

(List continued on next page.)

*Primary Examiner*—Charles E. Cooley
(74) *Attorney, Agent, or Firm*—Shook, Hardy & Bacon LLP

(57) ABSTRACT

A process and an apparatus for the production of a polyurethane mixture is described. The apparatus comprises a high-pressure mixing device provided with a mixing chamber opening onto a side of a discharge duct.

An elongated cleaning member is reciprocable inside the duct and is provided with a longitudinal channel for feeding a fluidized reinforcing material, for example reinforcing fibers or a reinforcing material in powder or granulate form, to be blended with the polyurethane mixture flowing into the discharge duct. The feeding channel for the reinforcing material terminates at the front end of the cleaning member, at a point where the flow of reinforcing material impinges the polyurethane mixture which emerges from the mixing chamber under high turbulence conditions. Blowing nozzles are provided to generate air jets for repeatedly deviating the flow of blended polyurethane mixture and reinforcing material flowing out from the discharge duct.

40 Claims, 5 Drawing Sheets

FOREIGN PATENT DOCUMENTS

| | | | |
|---|---|---|---|
| DE | 3427327 | * | 2/1985 |
| DE | 9315493 | | 12/1993 |
| DE | 196 18 393 A | | 11/1996 |
| DE | 29704560 U1 | | 10/1997 |
| EP | 0070486 | | 1/1983 |
| EP | 0132443 | | 2/1985 |
| EP | 0483856 | | 5/1992 |
| EP | 0 879 685 A2 | * | 11/1998 |
| GB | 1245216 | | 9/1971 |
| SE | 1 579 543 | | 11/1980 |
| WO | WO 91/12088 | | 8/1991 |
| WO | WO 96/35562 | | 11/1996 |
| WO | PCT/WO96/35562 | | 11/1996 |

* cited by examiner

APPARATUS FOR THE PRODUCTION OF POLYURETHANE MATERIAL WITH A CLEANING MEMBER HAVING A FILLER FEEDING CHANNEL AND AN INCLINED FRONT SURFACE

BACKGROUND OF THE INVENTION

1. Field of the Invention

The present invention relates to a process and apparatus for producing a polyurethane mixture for use in manufacturing structural panels or molded pieces such as, for example, door panels for automobiles or other vehicles and the like.

2. Description of the Related Art

Inert filler material, such as reinforcing fiber, is often used in the production of structural panels or, more generally, molded pieces of reinforced polyurethane material. Inert filler material improves both the rigidity and the mechanical properties of molded pieces of reinforced polyurethane material and structural panels.

For the purposes of the present invention, the term "filler" is understood to mean any solid, inert and fluidizable material, including also any material which can be transported by an air or gas flow. Such filler material can be used for filling and reinforcing purposes and can be suitably pretreated waste material. The filler material may therefore be in the form of powder, granulates, fibers of various lengths, continuous fibers, or any other suitable material which may be fluidized by an air flow, such as natural or synthetic fibers, a finely ground synthetic material, or recycled foams, finely chopped wood, milled cork, sawdust or the like.

For the purposes of the present invention, the term "long fibers" is understood to mean fibers whose length is equivalent to or greater than 3–5 mm, up to several centimeters or more, not excluding the use of continuous fibers.

When fillers are used in molded products, there is often a problem in obtaining an adequate mixture of the chemical reactants with the filler material, especially where the filler material is long or fragile. GB-A-1,245,216 and U.S. Pat. No. 4,397,407 both discuss methods of embedding a fluidizable filler material into formable mixtures of reactive chemical components.

In GB-A-1,245,216 filler material of reinforcing fibers is fed directly into a mixing chamber. The reactive chemical components are injected into the mixing chamber at right angles to the reinforcing fibers as they flow through the mixing chamber.

This process is unsatisfactory particularly where the filler material comprises long or very long fibers, fed in large amounts. The air flow transporting the filler, and the filler material itself, prevent close contact and homogeneous mixing of the reactive chemical components with the filler. Consequently, the resulting molded product contains defects which makes it commercially unacceptable.

U.S. Pat. No. 4,397,407, in contrast, describes a process where a foamable mixture of reactive chemical components is first prepared in a separate high-pressure mixing chamber and then fed by a long duct into an annular chamber where the reactive chemical mixture is blended with a filler, such as a granular material or short reinforcing fibers. The feeding duct leads to one side of the annular chamber, opposite to a discharge duct, and is formed by a movable tubular element which is connected to the mixing chamber by an additional channel.

This procedure also leads to inadequate mixing of the fillers with the reactants. In fact, when the reactive liquid mixture comes into contact with the flow of fibers or filler material, the reactive liquid mixture has lost most of its turbulence and kinetic energy inside the long feeding duct. By the time the reactants and the filler are combined, they have both assumed a substantially parallel flow.

The mixing procedure described above is also unsatisfactory where the filler is composed of a delicate material, such as glass fibers, which require simple, linear paths without pronounced curves and deviations.

U.S. Pat. No. 4,332,335, the complete disclosure of which is incorporated herein by reference, describes a head for mixing and ejecting reactive liquid components. The device described therein features a small mixing chamber separate from the discharge duct in which mixing takes places under high turbulence condition so as to prevent problems arising from imperfect mixing of the reactive liquid components. In the use of this mixing head the flow of the mixture is directly injected into a closed cavity of a mold or poured into an open mold by reciprocating the mixing head.

GB-A-1,579,543 and WO-A-96/35562 describe other apparatus where a tubular flow of liquid polyurethane material passes through an annular duct and comes into contact outside of that duct with reinforcing fibers axially flowing through a feeding channel concentrically arranged to the annular duct.

In particular, WO-A-96/35562 ("WO'562") describes a device for the production of molded pieces of formable synthetic material containing long reinforcing fibers and suggests that a high-pressure mixing head can be used for the production of polyurethane materials. In WO'562 the polyurethane mixing chamber is connected to an annular discharge duct via an intermediate duct, so that the reactive polyurethane mixture is separately prepared and fed into the discharge duct in the form of a tubular flow. The tubular flow of reactive polyurethane mixture then comes into contact with the fiber reinforcing material.

According to the examples of FIGS. 1 and 2 of WO'562, filler reinforcing fibers are fed into the discharge duct through a separate pipe member which coaxially extends along and beyond a cleaning member reciprocating inside the annular duct to discharge the mixture.

The use of a movable separate cleaning member to feed the reinforcing fibers may severely limit the performance of this type of apparatus, since the tubular cleaning member comprises inner and outer surfaces adhering to the cylindrical surfaces of the annular discharge duct. These surfaces are completely wetted by the polyurethane mixture during each supply step. The film of the mixture remaining between the interfaces thus tends to cause the cleaning member to adhere strongly to the double surface of the annular duct thereby completely blocking movement of that cleaning member. To avoid this blocking problem, a large hydraulic cylinder must be used for the cleaning member. This hydraulic cylinder must be able to exert a strong enough force to release the cleaning member during its rearward movement. The necessity of using a hydraulic cylinder with these capabilities increases the weight of the entire mixing apparatus and makes reciprocation of the mixing apparatus over the cavity of a mold more difficult.

Furthermore, given the fact that the adhesion forces between the contacting surfaces of the discharge duct and the cleaning member, with a length equal to or slightly more than five times its diameter, exceed the tensile stress of steel, it must be concluded that the dimensions of the resistant cross-sections of the cleaning member must be largely increased in order to prevent the tubular cleaning member and the fiber feeding pipe member from breaking or becoming damaged.

Finally, the use in WO'562 of an intermediate connecting duct between the mixing chamber and the annular duct discharging the polyurethane mixture dampens the flow of the polyurethane mixture thereby causing the reinforcing fibers to not be effectively mixed and homogeneously wetted with the reactant mixture.

Furthermore, the intermediate connecting duct will require its own cleaning member and corresponding hydraulic operating cylinder.

All these factors lead to complications in designing mixing apparatus and considerably increase the weight and dimensions of the apparatus itself.

Although WO'562 suggests that the design of the apparatus could be simplified by connecting the mixing chamber directly to a discharge duct, into which the pipe member for feeding the reinforcing fibers extends, this design would still suffer from the drawbacks discussed above.

WO'562, therefore, fails to disclose a suitable, lightweight apparatus design which would allow for improved wetting of fillers and operating conditions. The general teaching of WO'562 is limited to providing a separate, centrally located pipe for feeding fibers, which extends axially through and beyond the longitudinal bore of the cleaning member, to protrude and extend throughout the annular discharge duct so as to form the polyurethane mixture into a tubular flow surrounding the central flow of the reinforcing fibers with both tubular and central flows moving coaxially in the same direction.

In the general production of molded pieces of polyurethane material, particularly in molding pieces, containing a fluidizable filler, it is of great importance to have apparatus or mixing devices which are of simple design and extremely lightweight, yet allow for a high degree of mixing and impregnation of the filler material with the liquid polyurethane mixture before the polyurethane mixture and the filler material reach the inside cavity of a mold or are poured onto the surface of an underlying substrate.

Weight is an essential factor in the use of such mixing apparatus since it is normally manipulated over the substrate surface by the reciprocating arm of a positioning device, such as a robotic device. The mixing apparatus has to be moved quickly and reciprocated in various directions, along a predetermined path, subjecting the apparatus to sudden changes in direction and to intense braking and accelerating forces at each reversal of movement, so as to prevent undesirable accumulations of material from occurring locally.

Furthermore, in the production of large-sized pieces, for example automotive door panels, it is in general necessary to carry out a considerable number of strokes, for example 10 or more, by the mixing apparatus in order to cover the entire surface of the mold. Such activity also frequently occurs within an extremely short period of time, for example 8–10 seconds, in order to complete the discharge before the polyurethane mixture begins to react.

In the general use of mixing apparatus for adding fillers to polyurethane material, as described in DE-A-19618393 and DE-U-29704560, the flow of the resulting polyurethane-filler material mixture, which must be distributed in the cavity of a mold or on the surface of an underlying substrate, tends to assume a substantially conical or flat shape. The dimensions of this flow depend upon the design of the mixing apparatus and the mixing process, as well as the methods by which the two flows are combined or mixed with one another. Accordingly, the width of surface coverage of each stroke of the mixing apparatus in a given direction on the underlying substrate depends not only on the distance between the same mixing apparatus and the underlying substrate, but also to a large extent on the characteristics of the impregnated filler and/or reinforcing material, and on the methods by which the polyurethane mixture and the filler are combined or blended.

Generally, the width of surface coverage of each stroke cannot be controlled in any way. Therefore, when large panels or pieces with large dimensions are produced, the mixing apparatus must carry out several strokes, reciprocating across the underlying substrate. The mixing apparatus must cover the underlying substrate within an extremely short period of time before the polyurethane material begins to react.

Due to the considerable weight of the mixing apparatus as well as the forces of inertia exerted at each change or reversal of movement, extremely sturdy and bulky operating systems are required. Moreover, at high speeds at which the mixing apparatus is moving, the distribution of the mixed material may, in some cases, be non-uniform, creating an unsatisfactory product. Finally, a polyurethane-filler mixture, especially if the filler is composed of long fibers, has little or no tendency to flow on the deposition surface. Thus it tends to remain in the zone where it was initially deposited.

It is, therefore, essential to have a mixing apparatus which is not only lightweight and simple in design, but, at the same time, able to supply large quantities of polyurethane mixture within extremely short periods of time. In the case a filler material is blended with the polyurethane mixture, it is also important that the filler material, especially if composed of long fibers, be impregnated and wetted substantially homogeneously by the polyurethane mixture directly inside the same mixing device in order to ensure a good impregnation and a substantially homogeneous distribution within a short time. These characteristics are needed to achieve optimum structural properties in the resulting manufactured panels or molded pieces.

SUMMARY OF THE INVENTION

It is, therefore, an object of the present invention to provide a high-pressure, self-cleaning mixing apparatus for the production of molded pieces of polyurethane material containing a filler. This mixing apparatus responds to the need for a simple design and an extremely lightweight apparatus. This design also allows for rapid displacements without generating great resistance to accelerations at each reversal or change of its movement.

Another object of the present invention is to provide a mixing apparatus which improves the impregnation of filler material inside the mixing apparatus. This impregnation takes place under high turbulence conditions so that, in the molded pieces, the filler becomes strongly bonded to the polyurethane material of the molded composite pieces.

Yet another object of the present invention is to provide a self-cleaning, high-pressure mixing apparatus for practical, universal use. Fluidized filler material of any type or nature can be additionally fed into the apparatus by a flow of entraining air.

The apparatus according to the present invention can therefore be used for a large number of applications. For example, it can be used in the molding a wide variety of mechanical or structural pieces. It can also be used in expanded foams, both of rigid and flexible types, in which the filler may advantageously be a new, reused or recycled material, thus allowing for the production of more economical and relatively low-cost molded pieces.

Another object of the present invention is to provide a process and apparatus for the production of polyurethane material, and to obtain the deposition of the mixture on a larger area of a substrate or the cavity of a mold in a short time. The process of the present invention can be carried out within a relatively short period of time maintaining a homogeneous distribution of the mixture throughout the deposition. All of this accomplished without cumbersome and complicated operating systems for moving the mixing apparatus itself.

Another object of the present invention is to provide a process and apparatus as defined above, which allow the mixing apparatus to move at a relatively low speed, thus reducing the problems associated with the inertia phenomenon and reversal or variations in the movement of the apparatus.

Yet another object of the invention is to provide a process and apparatus for the production of polyurethane material, as defined above, which in addition to allowing for a uniform distribution of the sprayed or deposited material, also produces a product having good characteristics and allows for an adequate control of the spraying or deposition of the polyurethane and/or entrained reinforcing material discharged from the apparatus, for example, into a mold.

A further object of the invention is to provide both a process and apparatus, as defined above, which allow for control over the deposition of the polyurethane and/or entrained reinforcing material depending on the dimensional characteristics, the shape of the mold or of the molded piece and the relative movement required between the apparatus and the mold of surface on which the deposition is occurring.

A first innovative aspect of the invention lies in the simultaneous injection or co-injection of polyurethane mixture and a filler of non-reactive material which is achieved using a mixing apparatus of special design in which the meeting point between the polyurethane mixture and the filler may be kept close to the mixing chamber to improve wetting or saturation of the filler before the blend reaches the surface of a mold.

A second innovative aspect of the invention lies in the use of air jets to deviate the flow of the polyurethane mixture or the flow of the blended mixture of polyurethane and filler material to obtain and control the deposition of the mixture on a large area of a substrate or into the cavity of a mold, in a short time by a reciprocating movement in the mixing device.

Other objects, features, and characteristics of the invention will become apparent upon consideration of the following description and the appended claims with reference to the accompanying drawings, all of which form a part of this specification and wherein reference numerals represent corresponding parts in the various views.

BRIEF DESCRIPTION OF THE DRAWINGS

The accompanying drawings illustrate the present invention, wherein.

DETAILED DESCRIPTION OF THE INVENTION

A detailed description of preferred embodiments of the present invention are provided below.

In accordance with the first embodiment of the present invention, a self-cleaning, high-pressure mixing apparatus produces a polyurethane mixture containing a filler or reinforcing material. Fluidized filler material is fed into the apparatus and blended with a chemically reactive polyurethane mixture. The resulting mixture is then fed onto a substrate or into the cavity of a mold. The apparatus according to this first embodiment of the present invention includes a mixing chamber in which at least first and second polyurethane components are mixed. This mixture then flows into a discharge duct that is connected to the mixing chamber to a second mixing zone at the rear end of the discharge duct. An elongated cleaning member, located in the discharge duct, is reciprocable between an advanced position which closes the outlet of the mixing chamber, and a retracted position which opens the outlet of the mixing chamber towards the discharge duct. Channel means for feeding the fluidized filler material extend longitudinally with respect to the cleaning member of the discharge duct and opens directly into the mixing zone of the discharge duct at the outlet opening of the mixing chamber when the cleaning member is retracted. The flow of filler material from the feeding channel is co-injected simultaneously with the polyurethane mixture and impinges the polyurethane mixture emerging at high turbulence conditions from the mixing chamber.

According to a preferred embodiment of the invention, the channel for feeding the filler material is provided by an axial bore extending longitudinally along the length of the cleaning member provided within the discharge duct. In this way, the cleaning member and the feeding channel for the filler may be advantageously formed as one single member that can withstand considerable mechanical resistance, which is capable of withstanding high axial stresses. The channel for feeding the filler may be coaxially arranged with the cleaning member, or offset toward one side of the discharge duct, for example toward the side opposite the mixing chamber.

Figure 1:
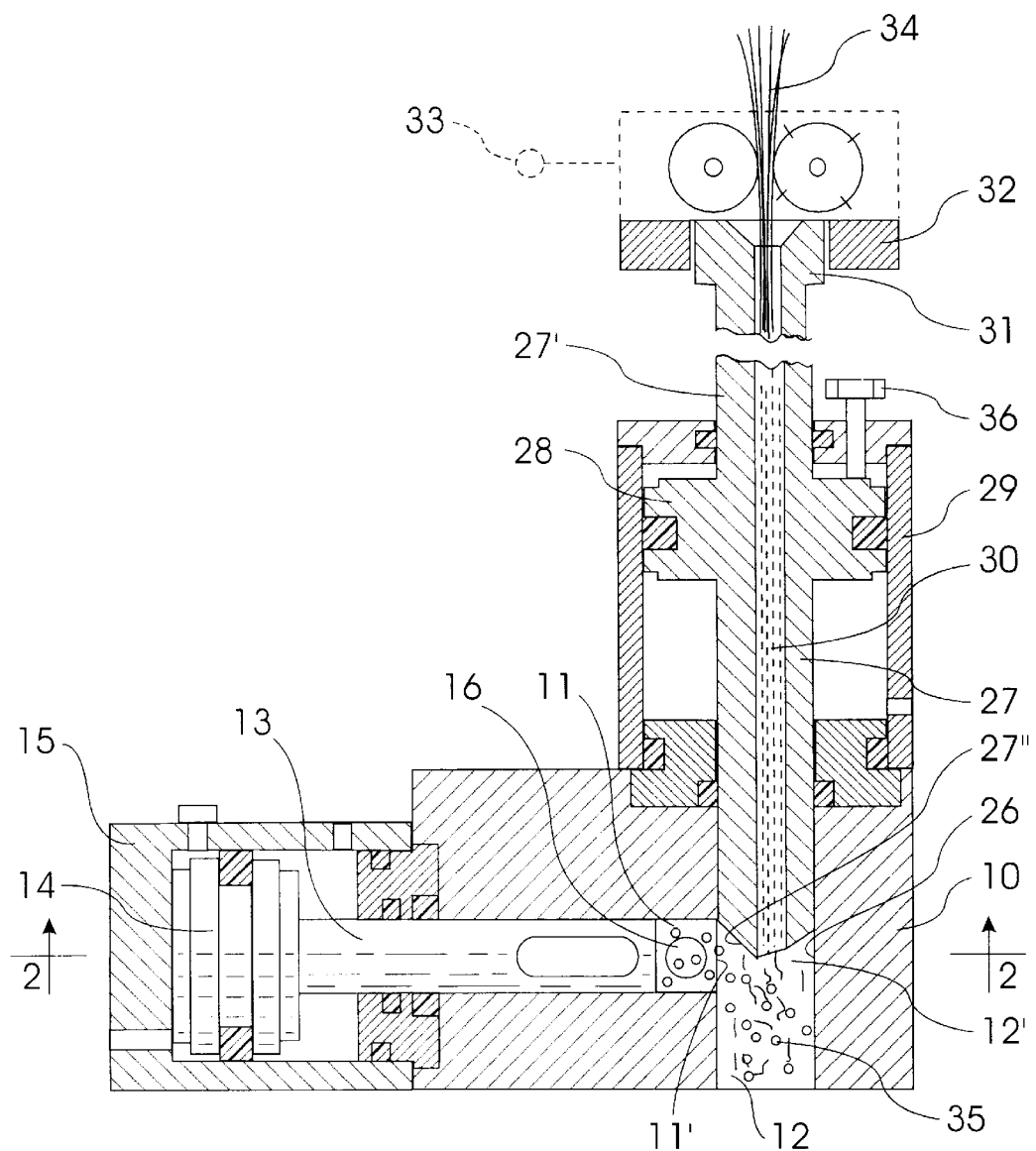
FIG. 1 is a longitudinal cross-sectional view of a first embodiment of a high-pressure mixing apparatus according to the invention.

The forward end of the cleaning member, at which the feeding channel for the fluidized filler material opens out, may terminate in a cylindrical surface positioned to be flush with the upper wall of the mixing chamber when the cleaning member is in a retracted condition. Alternatively, the forward end may terminate with shaped surface, such as, for example, a conical surface. Such shaped surface directs the flow of the polyurethane mixture emerging from the mixing chamber in a direction controlled by the shaped surface. When the shaped surface is conical and faces the outlet opening of the mixing chamber, the polyurethane mixture is diverted around the conical surface and downwardly away from the opening of the feeding channel for the filler material, at the rear mixing zone of the discharge duct where the flow of filler impinges the flow of polyurethane mixture from the mixing chamber as is shown in FIG. 1, and then towards the discharge duct. This design reduces the risk of the polyurethane mixture partially backing up inside the feeding channel and clogging it.

The mixing apparatus may also be provided with a means for varying and adjusting the position of the cleaning member and thereby the position of the forward end relative to the outlet from the mixing chamber. By adjusting the position of the cleaning member, one can also vary the flowing conditions of the polyurethane mixture emerging from the mixing chamber. This will then, in effect, vary the turbulence of the polyurethane mixture in the zone where it impinges and intersects the flow of the fluidized filler material coming out of the feeding channel of the cleaning member and within and along the discharge duct.

According to another aspect, the present invention resides in the use of air jets suitably oriented and directed towards the resulting flow of filler and/or polyurethane mixture emerging from the discharge duct. These air jets are positioned so as to cause lateral deviation of the flow of the mixture to one or more sides of the discharge duct. For example, continuous and/or alternating air jets can be activated during discharge, such as, at various points while the mixing apparatus is moved along a predetermined path, thereby moving the discharge of the resulting mixing into the cavity of the mold or onto the surface of an underlying substrate in a desired way.

According to another preferred embodiment, the invention relates to a high-pressure mixing apparatus for the production of molded pieces of polyurethane material, using, for example, long reinforcing fibers composed of, for example, glass or carbon fibers.

EXAMPLES

A first embodiment of the apparatus and the general principles of the present invention in connection with the production of polyurethane material containing a filler, for example, composed of long reinforcing fibers, will be now described with reference to FIGS. 1 and 2.

Figure 2:
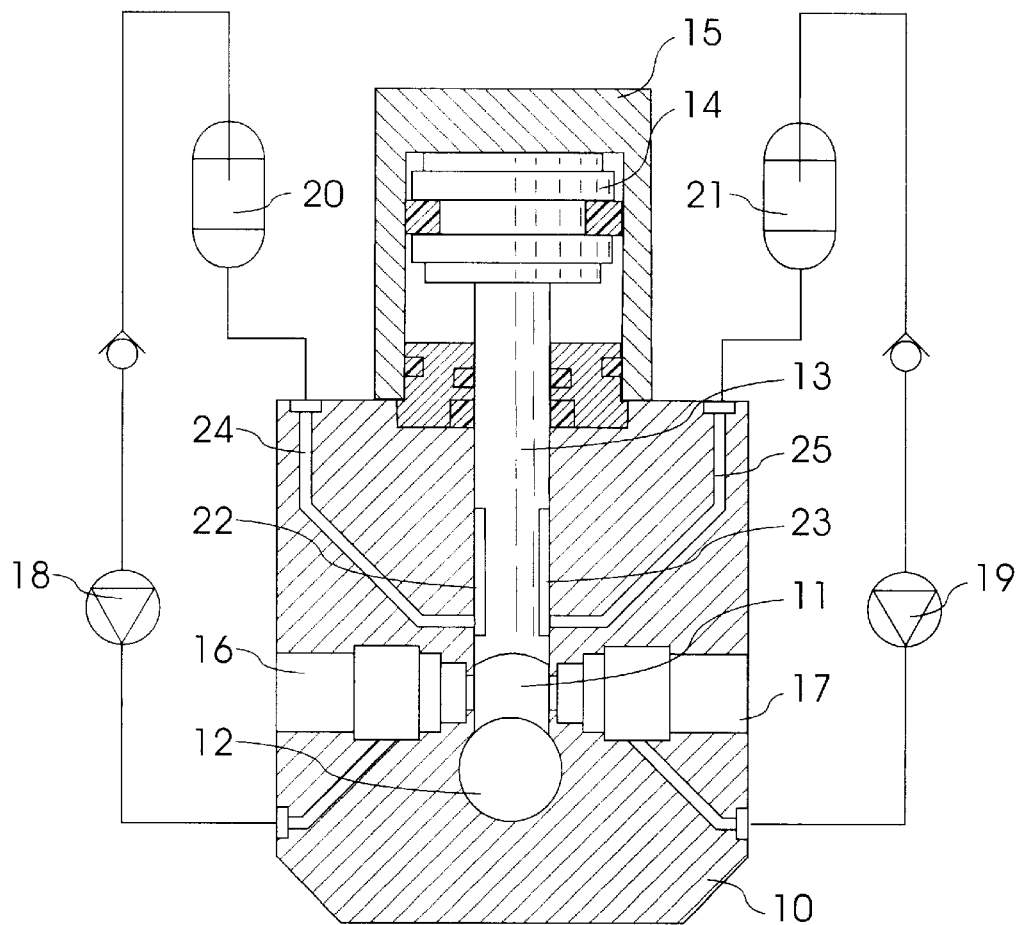
FIG. 2 is a cross-sectional view along line 2—2 of FIG. 1.

The same apparatus of FIGS. 1 and 2 may also be used for production of polyurethane material with any type of filler of non-reactive material; the apparatus maintains a solution simple in design for a lightweight mixing head, which is reliable in operation and free to use a full range of different fillers with little or no modifications to the equipment for feeding the filler.

As shown in the above mentioned Figs., the apparatus for the production of a polyurethane mixture with reinforcing fibers according to the invention essentially comprises a high-pressure, self-cleaning mixing device 10 provided with a small-sized mixing chamber 11 having a diameter ranging from 5 mm to 20 mm. The mixing chamber 11 opens directly into a second mixing zone of the rear or back end of a cylindrical discharge duct 12 that is opened upon retraction of the main clean out member or plug member 27. The longitudinal axis of the discharge duct is arranged at an angle of approximately 90° with respect to the longitudinal axis of the mixing chamber.

The mixing chamber 11 has a substantially cylindrical shape. A relatively small hole having the same diameter of the mixing chamber 11 extends from the rear of the mixing chamber 11 into the body 10 to allow for the reciprocation of a first cleaning member 13. The first cleaning member 13 is shaped in the form of a cylindrical plug which is connected to the piston 14 of a hydraulic operating cylinder 15.

According to a preferred embodiment the length of the mixing chamber 11 is about equal to or less than about twice the diameter of the above described hole. The length of the mixing chamber 11 substantially corresponds to a short stroke of the cleaning member 13 which can therefore move rapidly between its retracted and advanced positions. In the retracted position, shown in FIGS. 1 and 2, the cleaning member 13 opens the nozzles of the injectors 16 and 17 for the polyurethane components. In the retracted position, the cleaning member 13 also opens the outlet 11' of the mixing chamber 11 towards the discharge duct 12. In its advanced position, the cleaning member 13 closes the injectors 16 and 17 and the outlet opening 11' of the mixing chamber.

Each injector 16 and 17, as schematically shown in FIG. 2, is connected, via a metering pump 18 and 19, to corresponding tanks 20 and 21 which store the polyurethane components. These components may be fed directly into the mixing chamber 11 or made to recirculate through longitudinal slots 22 and 23 in the cleaning member 13 and corresponding recycling ducts 24, 25.

As mentioned above, in conformity with a first aspect of the invention, the apparatus is used for the production of molded pieces of polyurethane material impregnated with, for example, long reinforcing fibers. According to this aspect of the invention, a flow of fibers 34 is co-injected or brought directly into contact with a polyurethane mixture 35 inside the mixing device, in a high-turbulence mixing zone 12' at the rear end of the discharge duct 12. This high turbulence allows for an increased degree of impregnation of the fibers 34 with the polyurethane mixture 35 while they travel along the discharge duct 12 and toward the cavity of an underlying mold or substrate.

Consequently, it is important to maintain the highly turbulent conditions in the polyurethane mixture 35 emerging from the mixing chamber 11 as it enters the mixing zone 12' of the discharge duct 12. It is also important that these high turbulence conditions be maintained along the discharge duct 12 and as far as the outlet opening towards the mold cavity.

It is also important that the flow of incoming fibers 34 maintain a linear path and immediately come into contact with, or impinge, the flow of the mixture 35 emerging from the mixing chamber 11.

Therefore, according to this embodiment of the present invention, the length of the discharge duct 12, between the longitudinal axis of the mixing chamber 11 and the forward end of same duct, should be as short as possible. In general, the length of the discharge duct 12 should be about equal to or less than twice its diameter, and the cross-sectional area of the duct 12 is ranging from 2 to 5 times the cross-sectional area of the same mixing chamber 11.

As shown in the cross-section of FIG. 1, the discharge duct 12 extends back into cylindrical hole 26. Elongated cleaning member 27, connected to the piston 28 of a corresponding hydraulic operated cylinder 29, may reciprocate into cylindrical hole 26.

The cleaning member 27 has an axial bore 30 for feeding fibers 34. Axial bore 30 terminates and opens at the forward end of cleaning member 27.

Axial bore 30 thus defines a feeding channel for the fibers 34. Tubular extension 27', formed as one single piece with the cleaning member 27 and with the same piston 28 of the hydraulic cylinder 29 continues on the rear side of the piston 28. Tubular extension 27' of the fiber feed channel passes through the end wall of the cylinder 29 and terminates in a funnel like member 31. Funnel like member 31 provides for the introduction of a bundle of fibers, for example, via a roller-type feeder 32.

Finally, reference 33 in FIG. 1 schematically indicates a pressurized air source for feeding the fibers 34 from the feeding device 32 along the feed channel 30 towards the rear end of the discharge duct 12. In the mixing zone 12' at the rear end of the discharge duct 12, fibers 34 impinge the turbulent flow of the polyurethane mixture 35 emerging from the mixing chamber 11. The polyurethane mixture 35 flows in at substantially a right angle with respect to the flow of the fibers themselves.

Another aspect of the present invention relies in the deviation of the polyurethane mixture emerging from the mixing chamber 11 to prevent it from flowing up into, and clogging, the fiber feeding channel 30. According to this aspect, the forward end of cleaning member 27 terminates in a shaped surface, such as, for example, a conical surface 27", suitably tapered and arranged at or near to the outlet opening 11' of the mixing chamber 11 in the retracted condition of the cleaning member 27 as shown in FIG. 1. This flow deviating device also helps to distribute the polyurethane mixture 35 emerging from the mixing chamber 11 downwardly and immediately around and into the fibers 34 coming from the feeding channel. This flow deviation thus ensures that there will be a high degree of impregnation of the fibers with polyurethane mixture at the rear end and along the entire duct 12, and helps to create optimum operating conditions for the mixing apparatus.

The nature and length of the reinforcing fibers 34 and, more generally, the characteristics of the filler material fed in a loose or fluidized state may vary, depending on the molding requirements and the characteristics of the molded pieces to be produced. It is sometimes necessary to vary the turbulence conditions of the polyurethane mixture at the outlet 11' of the mixing chamber 11 in order to improve the impregnation conditions for the filler inside the discharge duct 12. This variation in turbulence can be achieved in various ways. For example, the outlet opening of the mixing chamber 11 can be throttled by the cleaning member 27. The cleaning member end, which can be conical shaped, can be advanced slightly, in an adjustable manner, with respect to the upper wall of the mixing chamber 11.

To this end, as indicated schematically at 36 in FIG. 1, it is possible to provide for the use of an adjustable means for the piston 28 of the hydraulic cylinder 29 of the cleaning member 27. By varying the position of the forward end of the cleaning member 27, relative to the outlet 11' of the mixing chamber 11, it is possible to vary the degree of throttling of the flow of the emerging mixture, and, consequently, to vary the turbulent conditions of the polyurethane mixture and the impregnation conditions for the reinforcing filler.

Figure 3:
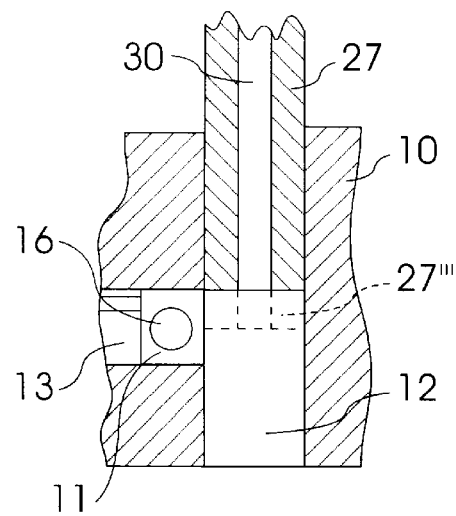
FIG. 3 is an enlarged detail showing a second embodiment of the mixing chamber of the apparatus according to the invention.

A second embodiment of the apparatus according to the present invention is shown in FIG. 3 of the accompanying drawings, and relates to a modified portion of the apparatus of FIG. 1.

The invention as presented in FIGS. 1 and 3, has the common feature of the fiber feeding channel 30 being integrally formed as one piece with the cleaning member 27.

The invention as presented in FIGS. 3 differs from that of FIG. 1 in that the external cylindrical surface of the cleaning member 27 continues as far as its front end, thus enabling it to be arranged flush with the upper surface of the mixing chamber 11, as shown by continuous lines in the same FIG. 3.

In both cases, as shown by the broken lines 27''' in FIG. 3, the outlet of the mixing chamber 11 can be throttled by suitably varying the position of the front end of the cleaning member 27. This can be achieved by adjusting the position of the stopping device 36.

In FIG. 1, the filler feeding channel 30 is formed by a longitudinal hole, offset to the side of the discharge duct 12 opposite the mixing chamber 11. In contrast, in the case of FIG. 3, the channel 30 is provided by a longitudinal hole, coaxially extending with the cleaning member 27.

Figure 4:
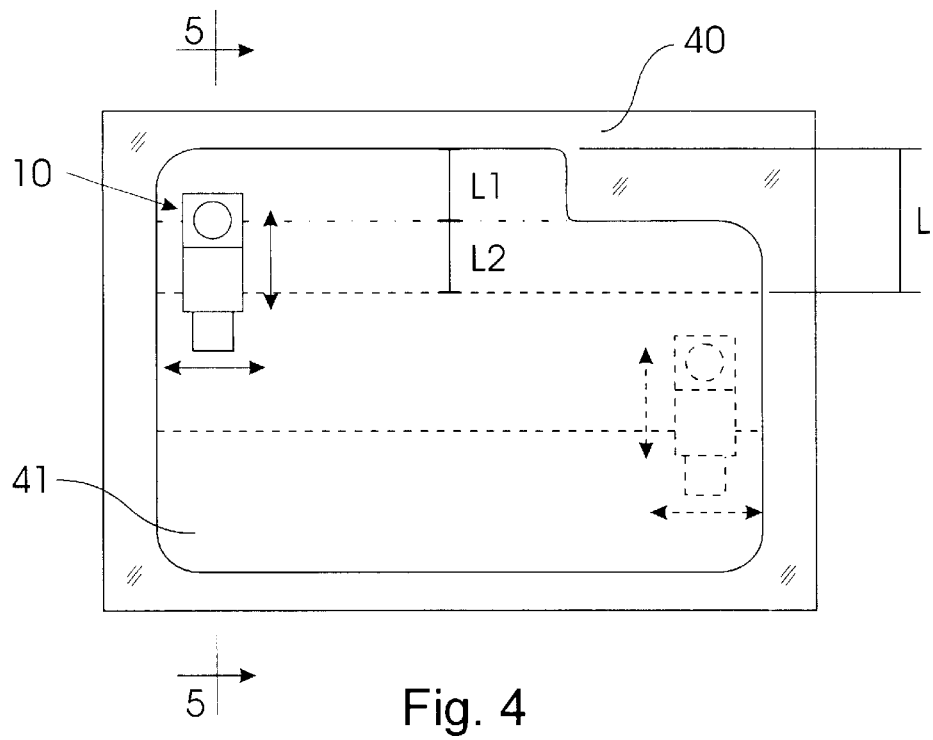
FIG. 4 is a top view of a mold and a high-pressure mixing apparatus, provided with air-jets illustrating the process according to the invention.

In FIG. 4, a generic open mold 40 is shown having a shaping cavity 41 for molding a piece of suitable configuration. This cavity could, for example, be used to mold a panel composed of polyurethane foam containing a filler and/or reinforcing material such as long or short glass fibers.

Reference number 10 represents, by way of example, a high-pressure mixing apparatus, such as that previously described, which may reciprocate in the direction of the double arrows, along a distribution path for discharging a flow of a composite polyurethane material. The flow path for the material depends upon the particular configuration of the mold and/or the piece to be produced. In the example of FIG. 4, the distribution takes place along by moving apparatus 10 along parallel bands, as shown schematically by the broken lines. It is understood that in place of the mixing apparatus according to FIGS. 1 and 3, any other type of mixing apparatus may be used, provided it is suitable for the purpose of the invention.

Figure 5:
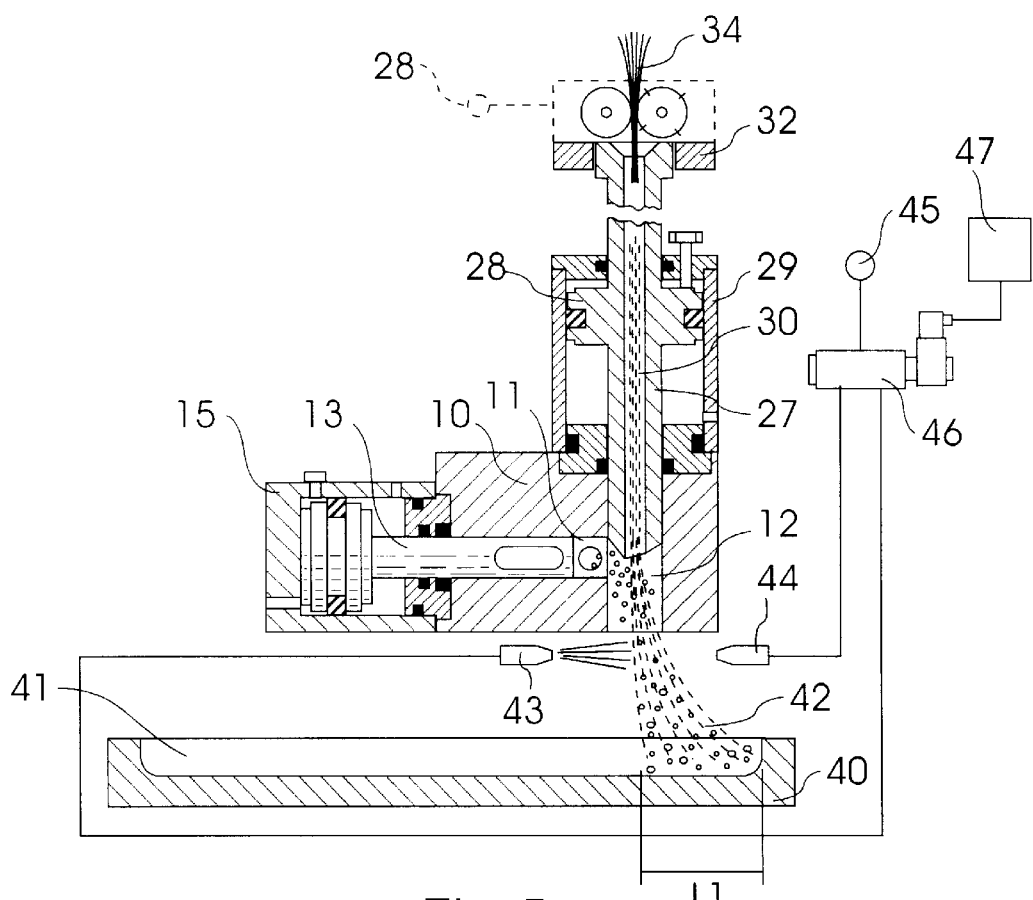
FIG. 5 is a sectional view along line 5—5 of FIG. 4 during generation of an air jet on one side of the flow of material being discharged into the mold.
Figure 6:
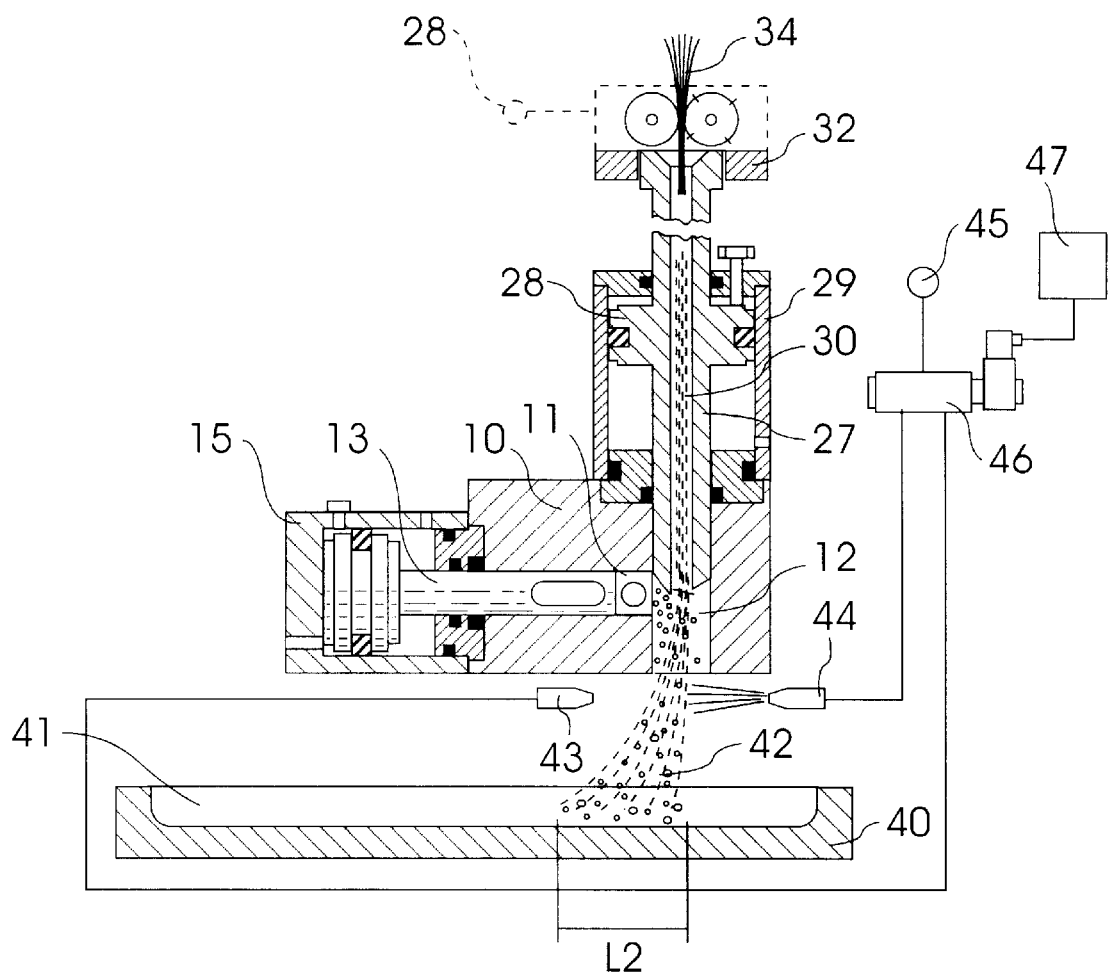
FIG. 6 is a sectional view similar to that of FIG. 5 with air jet being generated on the side opposite to that shown in FIG. 5.

According to this second aspect of the invention, as schematically shown in FIGS. 4–6, the band L can be evenly divided up, for instance, longitudinally into two complementary strips L1 and L2. Each of these strips can be simultaneously covered with the flow of polyurethane material and reinforcing fibers during movement of device 10, for example towards the right in FIG. 4.

According to this second aspect of the present invention, the polyurethane and fiber mixture 42 may be laid down in a larger band L, two or three times greater than that which can be obtained by using a conventional mixing device, by using a suitable blowing nozzles 43 and 44 to bend or deviate the flow of material 42 emerging from the discharge duct 12 of the apparatus. These blowing nozzles may be placed, for instance, on one or more sides or, alternatively, on opposite sides with respect to the longitudinal direction of the band L. Blowing nozzles 43, 44 can also be selectively connected in an intermittent or continuous manner to a pressurized-air source 45.

Although it is possible to use just one nozzle to deviate the flow of material 42 to one side of the mixing apparatus by means of air jets set at a frequency which is higher than that of the reciprocating movement of the mixing head 12, it is generally preferred to use two or more blowing nozzles varyingly arranged around the outlet aperture of the discharge duct 12. For example the two nozzles 43 and 44 are schematically shown in FIG. 5 as opposite to one another, so that the flow of material 42 can be deviated alternately to the right, the left, or in another direction. This arrangement allows for the substantially simultaneous and homogeneous distribution of the polyurethane material onto either or both of the two strips L1 and L2 of the longitudinal band L.

Thus, according to the example of FIGS. 5 and 6, the two blowing nozzles 43 and 44 are connected to the pressurized air source 45 by means of, for instance, a solenoid valve 46 or other suitable valves, capable of shutting off or rapidly changing the air flow between the two nozzles 43 and 44. The entire working process can be managed or controlled by a logic control unit 47.

The two nozzles 43 and 44 can be positioned below the outlet opening of the discharge duct 12 and can be fixed to or supported by the apparatus 10. These blowing nozzles 43 and 44 can be placed at a suitable distance from the mixture flow. If necessary, the nozzles can be attached in an adjustable manner, so as to move with the apparatus into a position which ensures the desired lateral deviation of the flow of material 42.

Control and adjustment of the lateral deviation of the flow of material 42 can be achieved not only by means of correct positioning or adjustment of the nozzles 43 and 44, but also, for instance, by varying or adjusting the pressure and flow of compressed air. Depending on the design of the mold or the piece to be produced, the air jets pressure can be modified or shut off completely. Nozzles of different designs are capable of modifying or varying the form of the same air jets.

The operation of the apparatus, in accordance with this second aspect of the invention, is briefly described below and as shown in FIGS. 4–6 with respect to the deposition of a polyurethane mixture containing reinforcing fibers along a longitudinal band L, which at a certain point is reduced to substantially half its width.

Initially, a mixing device 10 is located in the upper left corner of the mold 40, as shown by continuous lines in FIG. 4. Appropriate polyurethane chemicals are fed and mixed in the mixing chamber 11 and the resulting mixture of liquid polyurethane material is mixed with the reinforcing fibers 7 into the discharge duct 12. The mixing device 10 is moved and both nozzles 43 and 44 are alternately activated along the first portion of band L, so that the flow of material 42 emerging from the discharge duct 12 is repeatedly deviated to the right and left by the alternate air jets thus generated by the nozzles 43 and 44. In this way, as shown in FIGS. 5 and 6, during the first stroke of the mixing device 10, it is possible to cover, with the flow of material 42, the entire width of the band L, substantially simultaneously on both strips L1 and L2 up to the point where the device 10 arrives to the narrowest portion of the band L.

As this narrowed portion of band L, one of the two air-blowing nozzles 43 or 44 may be momentarily deactivated or the air flow can be partly reduced. Once the mixing device 10 has reached the end of its travel path, it is laterally shifted onto the neighboring band, as shown in broken lines in FIG. 4, and then runs along the entire length of the mold, again activating the two alternate air jets of nozzles 43 and 44, and so on until the entire surface of the cavity 41 of the mold 40 is covered.

During production of large-sized pieces, the reciprocating movement of the mixing device 10 can be approximately of the order of one second or slightly more. Consequently, the frequency with which the alternate air jets must be generated by nozzles 43 and 44 must be comparatively higher. For example, depending on the characteristics of the solenoid valves 46, the reinforcing material, the flow rates or other process requirements, as are well-known to those of skill in the art, for that specific production, the frequency generated by the air jet nozzles can be between about 20 and 60 Hz or more.

In the embodiment illustrated, the nozzles 43 and 44 are arranged opposite one another and orientated orthogonally to the axis of the discharge duct 12 for the flow of material 42. However, said nozzles or even additional ones, could be differently arranged and oriented. For example, the nozzles 43, 44 could form an angle with the axis of the discharge duct 12, being oriented toward the mold or an underlying substrate. In all cases, it is possible to produce polyurethane material containing a filler and/or reinforcing material, and to cover, during each stroke of the mixing apparatus, a very large band noticeably wider than that which can be obtained using a conventional apparatus. This improvement thus makes it possible to considerably reduce the time required to spray or lay down the reinforced polyurethane material onto the entire surface of the mold. It also allows for the reduction of the reciprocation speed of the entire apparatus. Alternatively, this improvement could enable the apparatus to cover wider surfaces while ensuring satisfactory impregnation of the filler and/or reinforcing material with a polyurethane mixture, and a substantially uniform distribution in the cavity of any mold or on an underlaying substrate.

Figure 7:
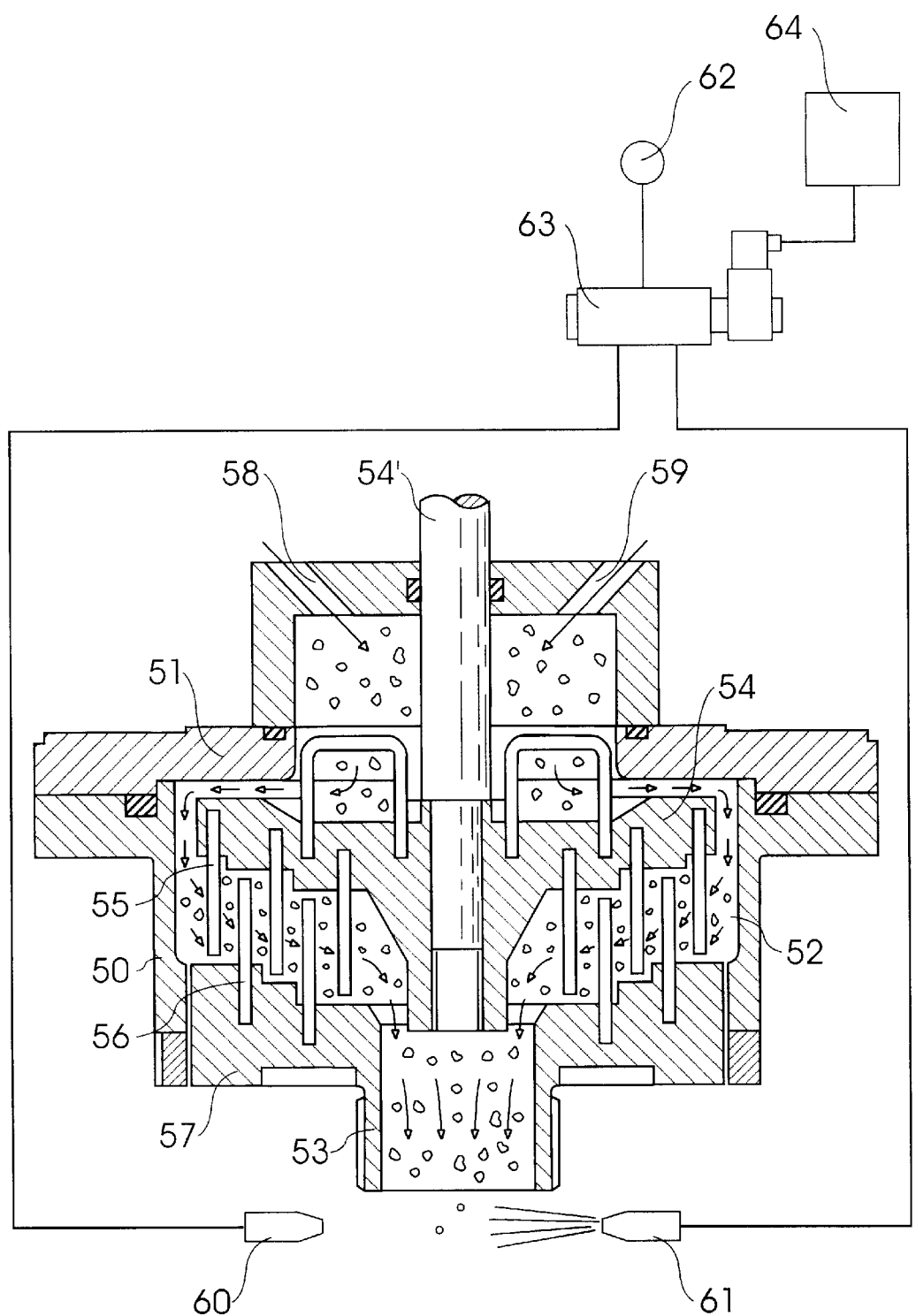
FIG. 7 is a sectional view of a low-pressure mixing apparatus provided with air-jets, illustrating a further embodiment of the invention.

With reference to FIG. 7 we will describe now a further embodiment of the present invention wherein the blowing nozzles 43, 44 have been applied to a low-pressure mixing device or stirrer, as shown.

According to the example of FIG. 7, the mixer substantially comprises a hollow body 50 closed by a cover 51, to define a mixing chamber 52 having an outlet 53.

A rotor member 54 is provided inside the mixing chamber 52 and is connected to a motor (not shown) by a shaft 55 to rotate. In the embodiment of FIG. 7, the rotor 54 is provided with a set of pins 55 arranged on one or more circumferences concentric with the axis 54' of the rotor 54, which are intermeshing with a set of pins 56 projecting from the bottom wall 57 of the mixing chamber 52. Reference 58 and 59 in FIG. 7 indicates inlet opening for chemical components to be mixed in the chamber 52.

According to the embodiment of FIG. 7 of the present invention, blowing nozzles 60, 61 are again provided to generate air jets at the outlet 53 of the mixing chamber 52, to laterally deviate the flow of polyurethane mixture flowing from the mixing chamber through the outlet aperture 53.

The blowing nozzles 60, 61 are connected to a pressurized air source 62 by a control valve 63 under the control of a control unit 64 as previously described for the example of FIG. 5.

While the invention has been described in connection with what are presently considered to be the most practical and preferred embodiments, it is to be understood that the invention is not to be limited to the disclosed embodiment, but on the contrary, is intended to cover various modifications and equivalents arrangements included within the spirit and scope of the appended claims.

What we claim is:

1. A high pressure, self-cleaning mixing apparatus for the production of reinforced polyurethane mixture wherein a fluidized filler material is blended with a polyurethane mixture, comprising:
   a mixing chamber for mixing at least a first and a second polyurethane component;
   a discharge duct, said mixing chamber having an outlet opening into a rear end of the discharge duct;
   an elongated cleaning member reciprocable in the discharge duct between an advanced position which closes the mixing chamber, and retracted position which opens the mixing chamber toward the discharge duct;

an inclined surface member at a front end of said elongated cleaning member and positioned in the rear end of the discharge duct when the elongated cleaning member is in the retracted position; and a feeding channel for feeding a fluidized filler material, said feeding channel extending longitudinally within the cleaning member and opening at a forward end thereof into a mixing zone at the rear end of the discharge duct;

wherein said polyurethane mixture emerges from the mixing chamber outlet into said discharge duct, and into contact under highly turbulent conditions with the fluidized filler material emerging from the feeding channel.

2. An apparatus according to claim 1, wherein the feeding channel is provided as one single piece with said elongated cleaning member.

3. An apparatus according to claim 1, wherein said inclined surface member comprises a conical surface tapering in a direction of the flow of the mixture in the discharge duct.

4. An apparatus according to claim 3, wherein said conical surface, together with a rear surface of the discharge duct near the outlet opening of the mixing chamber, defines an annular channel for a distribution of the polyurethane mixture at the rear end of the discharge duct.

5. An apparatus according to claim 3, further comprising a means for adjusting the position of the front end of the cleaning member with respect to the outlet opening of the mixing chamber.

6. An apparatus according to claim 1, wherein the cleaning member is connected to a reciprocating piston of a control cylinder, and whereby said apparatus further comprises a means for adjusting a stop position of the cleaning member in the retracted position of the reciprocating piston of the control cylinder of the cleaning member.

7. An apparatus according to claim 1, wherein the discharge duct has a length equal to or less than twice its width.

8. A mixing apparatus according to claim 1, further comprising airjet generating means to laterally deviate the flow of blended material at an outlet of the mixing apparatus.

9. A mixing apparatus according to claim 8, wherein said air jet generating means generates pulses of air to distribute the blended material.

10. A mixing apparatus according to claim 8, wherein said air jet generating means generates pulses of air to further mix the polyurethane mixture with the filler material.

11. An apparatus accounting to claim 1, wherein the feeding channel comprises a bore, extending longitudinally in a manner that is offset with respect to a central axis of the discharge duct.

12. An apparatus according to claim 11, wherein said bore is offset on a side of the discharge duct which is opposite to the outlet opening of the mixing chamber.

13. An apparatus according to claim 1, wherein said polyurethane mixture emerges from the mixing chamber and flows directly into contact with the flow of filler material.

14. An apparatus according to claim 1, wherein said polyurethane mixture emerges from the mixing chamber and flows perpendicular to the flow of filler material.

15. An apparatus according to claim 1, wherein said polyurethane mixture emerges from the mixing chamber and flows against the filler material.

16. An apparatus according to claim 1, wherein said polyurethane mixture emerges from the mixing chamber and flows radially against the filler material.

17. An apparatus according to claim 1, wherein said inclined surface member of said cleaning member is shaped to divert the flow of the polyurethane mixture away from said feeding channel opening.

18. An apparatus according to claim 1, wherein said inclined surface member is in the form of a conical surface.

19. An apparatus according to claim 1, wherein the polyurethane mixture emerges from the mixing chamber and subsequently envelops the fluidized filler material.

20. An apparatus according to claim 1, wherein the fluidized filler material is impregnated by the polyurethane mixture.

21. An apparatus according to claim 1, wherein the feeding channel is integrally formed within the cleaning member.

22. A high-pressure, self-cleaning mixing device for the production of fiber reinforced polyurethane material comprising:

a mixing chamber for mixing at least a first and a second polyurethane component;

a first cleaning member and first control means for reciprocating said first cleaning member in the mixing chamber;

a discharge duct, said mixing chamber having an outlet opening into a rear end of the discharge duct;

a second cleaning member and second control means for reciprocating said second cleaning member in the discharge duct, and a fiber feeding channel extending longitudinally in said second cleaning member, and axially opening close to the outlet opening of the mixing chamber in a retracted condition of the second cleaning member; and an inclined surface member at a front end of said second cleaning member for deviating a turbulent flow of polyurethane mixture coming out from the mixing chamber outlet downwardly and into contact with a flow of fiber emerging from the feeding channel into a mixing zone at the front end of the fiber feeding channel, wherein the inclined surface member is positioned at the rear end of the discharge duct close to the outlet opening at the mixing chamber when the second cleaning member is in the retracted condition.

23. A high-pressure mixing device according to claim 22, wherein said inclined surface member comprises a conical surface at the front end of the second cleaning member.

24. An high-pressure mixing device according to claim 22, further comprising an annular channel for a distribution of the polyurethane mixture from the mixing chamber into the discharge duct, said annular channel provided between a conical tip of the second cleaning member and a rear surface of the discharge duct near the outlet opening of the mixing chamber.

25. A mixing device according to claim 22, further comprising air jet generating means to laterally deviate the flow of blended material at an outlet of the mixing device.

26. A mixing device according to claim 25, wherein said air jet generating means generates pulses of air to distribute the blended material.

27. A mixing device according to claim 25, wherein said air jet generating means generates pulses of air to further mix the polyurethane mixture with the fiber material.

28. A high-pressure mixing device according to claim 22, further comprising an adjustable throttling member for throttling the outlet opening of the mixing chamber, whereby said throttling member comprises the second cleaning member.

29. A high-pressure mixing device according to claim 22, wherein said second control means comprises a reciprocating piston of a control cylinder, and whereby said fiber feeding channel extends, at its rear end, through the piston of the control cylinder, in a single piece with the second cleaning member.

30. An apparatus according to claim 11, wherein said polyurethane mixture emerges from the mixing chamber and flows directly into contact with the flow of fiber.

31. A device according to claim 22, wherein said fiber feeding channel extends longitudinally along and is offset toward one side of the second cleaning member.

32. A device according to claim 31, wherein said fiber feeding channel is offset on a side of the discharge duct which is opposite to the outlet opening of the mixing chamber.

33. A device according to claim 22, wherein said polyurethane mixture emerges from the mixing chamber and flows against the flow of fiber.

34. A device according to claim 22, wherein said polyurethane mixture emerges from the mixing chamber and flows radially against the flow of fiber.

35. A device according to claim 22, wherein said polyurethane mixture emerges from the mixing chamber and flows angularly against the flow of fiber.

36. A device according to claim 22, wherein said inclined surface member is conical.

37. A device according to claim 22, wherein the fiber feeding channel is integrally formed in said second cleaning member.

38. A high-pressure, self-cleaning mixing apparatus for the production of reinforced polyurethane mixture wherein a fluidized filler material is blended with a polyurethane mixture, comprising:

a mixing chamber for mixing at least a first and a second polyurethane component;

a discharge duct, said mixing chamber having an outlet opening into a rear end of the discharge duct;

an elongated cleaning member reciprocable in the discharge duct between an advanced portion which closes the mixing chamber, and a retracted position which opens the mixing chamber towards the discharge duct, said cleaning member having an inclined forward end; and a feeding channel for feeding a fluidized filler material, said feeding channel extending longitudinally through the cleaning member and opening through the inclined forward end thereof into a mixing zone adjacent the rear end of the discharge duct;

wherein said polyurethane mixture emerges from the mixing chamber into said mixing zone adjacent the rear end of said discharge duct, and into contact with the fluidized filler material emerging from the feeding channel.

39. An high-pressure, self-cleaning mixing device for the production of fiber reinforced polyurethane material comprising:

a mixing chamber for mixing at least a first and a second polyurethane component;

a first cleaning member and first control means for reciprocating said first cleaning member in the mixing chamber;

a discharge duct, said mixing chamber having an outlet opening into a rear end of the discharge duct;

a second cleaning member and second control means for reciprocating said second cleaning member in the discharge duct; and a fiber feeding channel extending longitudinally in said second cleaning member, and axially opening close to the outlet opening of the mixing chamber in a retracted condition of the second cleaning member; and said second cleaning member having an inclined forward end to deviate the flow of polyurethane mixture coming out from the mixing chamber away from said feeding channel opening and into contact with the fibers emerging from the feeding channel.

40. A high pressure, self-cleaning mixing apparatus for the production of reinforced polyurethane mixture wherein a fluidized filler material is blended with a polyurethane mixture, comprising:

a mixing chamber for mixing at least a first and a second polyurethane component;

a discharge duct, said mixing chamber having an outlet opening into a rear end of the discharge duct;

an elongated cleaning member reciprocable in the discharge duct between an advanced position which closes the mixing chamber, and retracted position which opens the mixing chamber toward the discharge duct;

a feeding channel for feeding a fluidized filler material, said feeding channel extending longitudinally within the cleaning member and opening at a forward end thereof into a mixing zone at the rear end of the discharge duct; and a deviating means for deviating a turbulent flow of polyurethane mixture coming out from the mixing chamber outlet downwardly and into contact with a flow of fiber emerging from the feeding channel into a mixing zone at the front end of the fiber feeding channel, at the rear end of the discharge duct close to the outlet opening at the mixing chamber.

* * * * *